US009065655B2

(12) United States Patent
Ignatchenko (10) Patent No.: US 9,065,655 B2
(45) Date of Patent: Jun. 23, 2015

(54) SECURE PASSWORD MANAGEMENT SYSTEMS, METHODS AND APPARATUSES

(71) Applicant: OLogN Technologies AG, Triesen/FL (LI)

(72) Inventor: Sergey Ignatchenko, Innsbruck (AT)

(73) Assignee: OLogN Technologies AG, Triesen/fL (LI)

(*) Notice: Subject to any disclaimer, the term of this patent is extended or adjusted under 35 U.S.C. 154(b) by 0 days.

(21) Appl. No.: 13/920,530

(22) Filed: Jun. 18, 2013

(65) Prior Publication Data

US 2013/0339746 A1    Dec. 19, 2013

Related U.S. Application Data

(60) Provisional application No. 61/661,250, filed on Jun. 18, 2012.

(51) Int. Cl.
*G06F 21/00* (2013.01)
*H04L 9/32* (2006.01)
*G06F 21/31* (2013.01)

(52) U.S. Cl.
CPC .............. *H04L 9/3226* (2013.01); *G06F 21/31* (2013.01)

(58) Field of Classification Search
USPC ......................................................... 713/183
See application file for complete search history.

(56) References Cited

U.S. PATENT DOCUMENTS

| 6,665,800 | B1 | 12/2003 | Jaber |
| 6,720,860 | B1 | 4/2004 | Narayanaswami |
| 7,650,632 | B2* | 1/2010 | Yantzi ............................... 726/6 |
| 7,802,297 | B2 | 9/2010 | Bennett |
| 8,255,696 | B2* | 8/2012 | Florencio et al. ............. 713/184 |
| 8,667,603 | B2* | 3/2014 | Brown et al. .................... 726/27 |
| 8,756,672 | B1* | 6/2014 | Allen et al. ........................ 726/7 |
| 2006/0176281 | A1 | 8/2006 | Bennett et al. |
| 2008/0263361 | A1* | 10/2008 | Dutta et al. .................... 713/182 |
| 2009/0252331 | A1* | 10/2009 | Schadeberg .................. 380/283 |
| 2009/0276839 | A1 | 11/2009 | Peneder |
| 2010/0005525 | A1* | 1/2010 | Fischer ........................... 726/21 |
| 2010/0050242 | A1 | 2/2010 | Delia |

(Continued)

FOREIGN PATENT DOCUMENTS

EP    2 136 309 A2    12/2009

OTHER PUBLICATIONS

Abdullah et al., Graphical Password: User's Affinity of Choice—An Analysis of Picture Attributes Selection, IEEE (2008).

(Continued)

*Primary Examiner* — Amare F Tabor
(74) *Attorney, Agent, or Firm* — Arnold & Porter LLP (57) ABSTRACT

The systems, methods and apparatuses described herein provide a computing environment for authenticating a user. An apparatus according to the present disclosure may comprise a non-volatile storage, a user interface, and a password engine. The password engine is configured to retrieve two or more predetermined prompts from the non-volatile storage, present the two or more predetermined prompts on the user interface to a user in a random order, receive a first set of input(s) in response to the two or more predetermined prompts, create an encryption keyword from the received first set of input(s) according to an original order of the two or more predetermined prompts stored in the non-volatile storage, and use the encryption keyword to authenticate the user.

35 Claims, 5 Drawing Sheets

(56) References Cited

U.S. PATENT DOCUMENTS

2010/0174758 A1 7/2010 Radenkovic et al.
2010/0268934 A1* 10/2010 Hinton et al. ................ 713/152

OTHER PUBLICATIONS

Gao et al., "Analysis and Evaluation of the ColorLogin Graphical Password Scheme," 2009 Fifth In Image and Graphics, pp. 722-727 (2009).

O'Gorman, "Comparing Passwords, Tokens, and Biometrics for User Authentication," Proceedings of the IEEE 91(12):2021-2040 (2003).

Van Oorshot et al., "Purely Automated Attacks on PassPoints-Style Graphical Passwords," IEEE Transactions on Information Forensics and Security 5(3):393-405 (2010).

Zhai et al., Design and Implementation of Password-Based Identity Au In and System Modeling (ICCASM) pp. V9-253-257 (2010).

International Search Report for International Application No. PCT/IB2013/001278, dated Oct. 24, 2013.

Written Opinion for International Application No. PCT/IB2013/001278, dated Oct. 24, 2013.

* cited by examiner

SECURE PASSWORD MANAGEMENT SYSTEMS, METHODS AND APPARATUSES

RELATED APPLICATIONS

This application claims priority to U.S. Provisional Application No. 61/661,250, filed Jun. 18, 2012, entitled "Secure Password Management Systems, Methods and Apparatuses," the content of which is incorporated herein by reference in its entirety.

FIELD OF THE DISCLOSURE

The systems, methods and apparatuses described herein relate to storing and releasing passwords, such that a user is only required to remember one set of prompt-based associations to gain access to a plurality of securely stored passwords.

BACKGROUND

Websites and other online and offline entities often require user authentication through use of a password or a PIN. These entities may have differing requirements for password security, requiring some passwords to be longer and more complicated than others. Individuals who have a significant online presence may be required to remember numerous passwords. It is not uncommon for individuals to store their passwords in unsecure manners (for example, written in unencrypted files stored on their computers) to remember which password is tied to which site. Such practices significantly undermine the security of online systems.

What is needed are systems, methods and apparatuses for the secure storage and release of passwords such that a user is only required to remember association(s) with one or more prompts.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

According to the present disclosure, a computing device may store one or more passwords in a master password storage. The passwords stored in the password storage may be for any number of applications, data, remote computers, or remote computer services. The contents of the password storage may be encrypted (or decrypted) using a Master Encryption Key (for example, a symmetric key suitable for use in an AES-256 encryption algorithm) such that unauthorized users cannot gain access to the passwords stored in the password storage.

Whenever a user (or the operating system or an application) wishes to accomplish a task requiring a password (e.g., start an application which requires elevated privileges, encrypt data, log-in to a website), the user may be presented with a set of prompts, and then may enter a character string association for each of the presented prompts according to the present disclosure. The character strings entered by the user in turn may be used to calculate an Encryption Keyword. Thereafter, the Encryption Keyword may be used to derive the Master Encryption Key used to encrypt/decrypt the contents of the password storage. It should be noted that the Encryption Keyword need not be entered by the user as an integrated whole but may be calculated from user input as described below. Accordingly, the systems and methods described herein are capable of requesting different versions of user input without having to change the Encryption Keyword. This capability, in turn, makes the systems and methods described herein less susceptible to certain classes of phishing attacks.

To generate the Master Encryption Key, a user may use an electronic device to capture or select n distinct prompts, wherein "n" is any integer. For example, the user may select eight images stored on the device or captured by the device's camera. The user may associate y characters with each image, again wherein "y" represent any integer. For example, the user may associate two characters with each selected image. The character strings associated with each of the eight images may be combined (in the same order as the images are ordered), to generate an Encryption Keyword having sixteen characters. In one exemplary embodiment, the character strings may be concatenated in the same order as the images are ordered. The electronic device may then derive a Master Encryption Key based on the generated Encryption Keyword corresponding to a particular order of images. The images and the order of the images used to generate the Encryption Keyword may be stored for later retrieval and use.

Because the user only needs to remember one set of prompt/character string associations, instead of remembering a multitude of passwords for different applications and/or websites, the user may use considerably more complex passwords or passphrases (stored in the password storage) for each application and/or website to improve security. For example, the stored passwords may contain 256 bits of random characters, as the user may not be required to remember or even know these passwords. Using the systems and method described herein, passwords that correspond to the individual applications, data, remote services, etc. may be saved without the user even entering or seeing them, and may be retrieved automatically after the user enters the character strings associated with the provided prompts.

Figure 1:
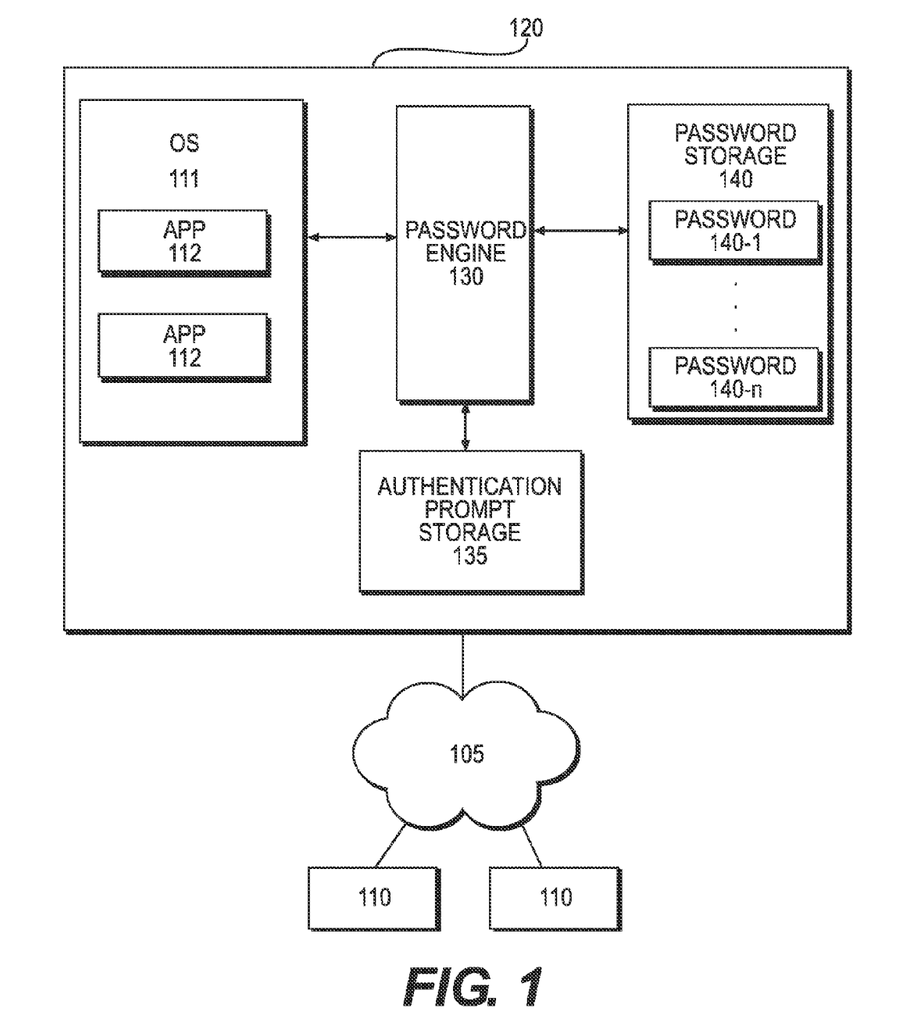
FIG. 1 is a block diagram of an exemplary system according to the present disclosure.

FIG. 1 shows an exemplary electronic device 120 according to the present disclosure. A suitable device 120 may be any form of an electronic device, such as a computer, laptop, smartphone or tablet computer. As shown on FIG. 1, the electronic device 120 may communicate with one or more remote electronic devices or servers 110 via a communications channel 105 coupled to the device 120. For example, a tablet computer may be capable of transmitting and receiving communications from a financial web site such as a bank, an internet email service, or the like. This communications channel may be any suitable communication channel including, but not limited, WiFi, LAN, WAN, 3G, 4G, Long Term Evolution (LTE), Ethernet and/or the Internet, or any communications channel developed in the future.

The electronic device 120 may comprise an operating system 111 and one or more applications 112 (such as an e-mail application or an Internet browser) running on a processor (not shown). The device 120 may further comprise a password storage 140 that stores some or all of the passwords that the user may use to access applications or data running on the device 120 itself and/or to access computing devices and/or services running on remote computers 110 (e.g., passwords to gain access to a banking website or an internet email service). By way of example and not limitation, the password storage may be implemented using any suitable non-volatile memory. The passwords 140-1 through 140-n stored in the password storage 140 may be stored in an encrypted state. Password engine 130, which may comprise an encryption/decryption engine as well as other hardware and/or software components to implement the functionality described herein, may use a "Master Encryption Key" to encrypt and/or decrypt the contents of the password storage 140. An authentication prompt storage 135 may store the prompts (and their order) used to generate the Encryption Keyword as described further herein. By way of example and not limitation, the authentication prompt storage 135 may be implemented using any suitable non-volatile memory. Operating system 111 and applications 112 may request access to, or storage of, passwords in the password storage 140 via the password engine 130.

It should be recognized that in some embodiments, any and/or all of the password engine 130, password storage 140, and/or the authentication prompt storage 135 may be located on a remote device (such as a remote server, computer and/or storage device) instead of on the device 120 itself, and the device 120 may communicate with these components through the communications network 105. To enhance security, these communications may be over an authenticated and secure communications channel, for example, an SSL channel. It is also within the scope of the present disclosure wherein the functionality described with respect to each of the password engine 130, password storage 140, and/or the authentication prompt storage 135 is spread or divided among one or more processes, modules or threads, and/or spread or divided among one or more physical devices.

Figure 2A:
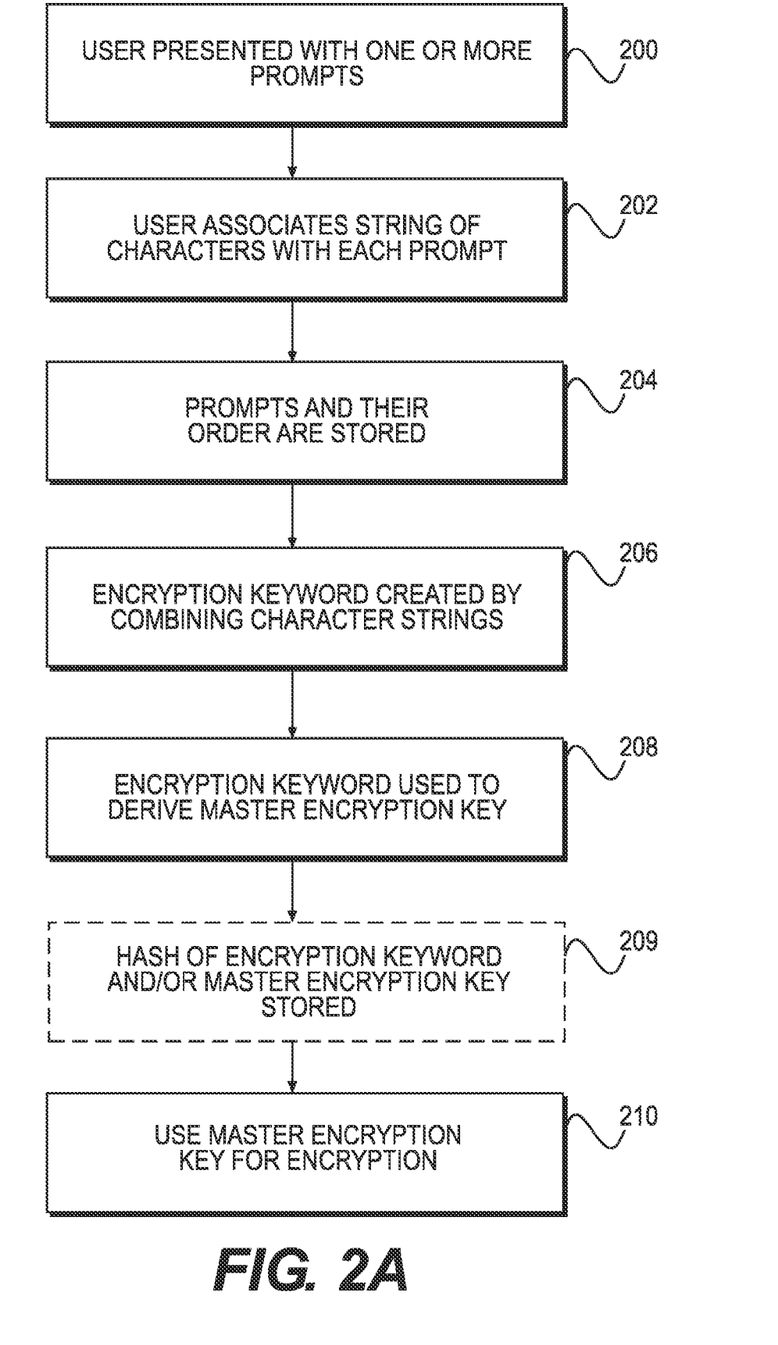
FIG. 2A is a flow diagram of an exemplary method for creating a Master Encryption Key, that may be used in the encryption/decryption process, using one or more prompts.

FIGS. 2A through 2D are directed to exemplary flow diagrams according to the present disclosure for generating a Master Encryption Key which may be used to encrypt/decrypt the contents of the password storage 140. More particularly, FIG. 2A is a flow diagram of an exemplary method by which an "Encryption Keyword" may be generated in a manner that is easy for a user to remember but otherwise difficult for a hacker to guess or break. The Encryption Keyword may then be used as the basis for generating the Master Encryption Key used by the password engine 130 to encrypt/decrypt the contents of the password storage 140. In other embodiments, it may not be necessary to generate a separate Master Encryption Key and the Encryption Keyword itself may instead serve as a master encryption key.

At step 200, the user is presented with one or more prompts. A prompt may be any information that is capable of evoking an association in the user's mind. By way of example and not limitation, the prompt may be an image, text, audio, or video (or any combination of the foregoing). For example, the prompt may be an image, or an excerpt from a song, or a title of a song, or a video clip. While the embodiments discussed in this disclosure in the main involve the use of images as prompts, it is to be understood that these embodiments are provided for purposes of illustration and are not intended to limit the scope of the present disclosure.

Thus, for example, at step 200 the user may be presented with eight images (referred to herein as Img1 through Img8). It should be recognized, however, that the present disclosure is not limited to any specific number of prompts and that fewer or more prompts may be presented to the user.

At step 202, the user may associate a string of characters (e.g., A through Z, 0 through 9, special characters such as %, $, #, etc. that appear on a keyboard) with each image. It should be recognized that the present disclosure is not limited to these specific exemplary characters, and that any character may be used including, but not limited to, foreign language characters. Additionally, symbols (for example, a "square," a "triangle," etc.), pictograms or icons may also be used instead of, or in addition to, characters. In an exemplary embodiment, the user may associate two characters with each image, although it should be recognized that the present disclosure is not limited to this specific number and that any predetermined number of characters may be associated with each prompt.

In some embodiments, instead of a predetermined number of characters per prompt, a variable number of characters (e.g., words of different lengths) may be associated with each prompt. In such embodiments, when entering associations, separate entry fields may be used for each of the prompts. Alternatively, if only one entry field is present, for example, each variable length character string associated with a prompt may be distinguished from other variable length character strings by a separator (e.g., a space or a predetermined character).

The present disclosure takes advantage of the fact that many prompts may evoke a unique association in a user that may be easy for the user to remember but difficult for a potential attacker to guess. For example, a picture of a specific person's face, a specific item and/or a specific place may evoke an association with a particular relationship, place, event, milestone or the like that the user may easily characterize and remember using a string of two (or any number) of characters. As another example, an excerpt from a song or a video clip (or titles of the same) may evoke specific associations in a user that can be characterized using a string of characters but that are hard for an attacker to guess.

At step 204, the prompts presented to the user (as well as the order of each prompt in the sequence of prompts that is presented to the user) are stored in the authentication prompt storage 135. In some embodiments, as necessary, the images (and their order) may also be associated with a User ID of the user.

At step 206, the character strings associated with each image are combined (in the same logical order in which the images were stored in the authentication prompt storage 135) to create an Encryption Keyword. Table 1 is helpful in explaining this concept. Assume for example that the user is presented eight images in the sequential order Img1 through Img8. Assume further, that the user associates a two character string with each image as depicted in Table 1.

TABLE 1

| Img1 | AB |
| Img2 | CD |
| Img3 | EF |
| Img4 | GH |
| Img5 | IJ |
| Img6 | KL |
| Img7 | MN |
| Img8 | OP |

Thus, at step 204 the images Img1 through Im8, and the order in which the images were presented to the user (i.e., sequentially as Img1 through Img8), are stored in the authentication prompt storage 135. At step 206, the character strings for each image are combined together (in the order in which the images were presented to the user and stored in the authentication prompt storage 135) to create the Encryption Keyword ABCDEFGHIJKLMNOP.

At step 208, the Encryption Keyword is used to derive a Master Encryption Key. The Master Encryption Key may be, for example, a symmetric key for use in a symmetric encryption algorithm such as AES256. The process and/or algorithm for deriving the Master Encryption Key from the Encryption Keyword should be deterministic. In one exemplary embodiment, a function similar to OpenSSL's EVP_BytesToKey( ) may be used to calculate the Master Encryption Key based on the Encryption Keyword. At step 210, an empty password storage 140 may be created. This empty storage may nevertheless include, for example, information about the storage's structure (for example, information indicating that presently the storage has zero passwords stored) and/or storage checksums encrypted by the Master Encryption Key. In some embodiments, at this step 210, the Master Encryption Key may further be used to encrypt existing passwords that are imported from external sources, and/or newly created passwords as they are added, to the password storage 140. In other embodiments the passwords may be imported into the password storage 140 at a later point in time.

It should be noted that steps 206-210 are optional, and in some embodiments may be omitted.

It is to be appreciated that other than temporary storage in volatile memory during the process of generating the Encryption Keyword and/or deriving the Master Encryption Key in order to accomplish the acts of encryption or decryption, it is not necessary (although it is permissible) for the operation of the present disclosure that the character strings, Encryption Keyword, or Master Encryption Key be permanently stored in non-volatile memory (either on the device 120 or on a remote device). In fact, the security of the methods and systems of the present disclosure may be improved if the character strings, Encryption Keyword and Master Encryption Key are not permanently stored in memory. In such embodiments, even if an attacker obtains complete control over the device 120 (e.g., when device 120 is not being operated by the user), an attacker will be unable to obtain the character strings, Encryption Keyword, and/or Master Encryption Key because they are not permanently stored anywhere.

In one embodiment, the exemplary process depicted in FIG. 2A may include an optional step 209 (shown in dashed lines) of calculating and storing a hash of the Encryption Keyword and/or the Master Encryption Key in a non-volatile memory (e.g., authentication prompt storage 135). This hash may be used in performing certain checks as described hereinafter while still maintaining security in that the hash cannot be used to derive the Encryption Keyword and/or the Master Encryption Key.

In some embodiments, instead of the user being presented with all of the prompts (e.g., the eight images) at one time, the user may be presented with each prompt sequentially and the user may provide a character string association for the prompt before being presented with the next prompt. This sequence may repeat until the user is presented with the predetermined number of prompts (e.g., eight images). It is within the skill of one of ordinary skill in the art to incorporate this alternative embodiment in the method disclosed in FIG. 2A.

It is to be recognized that the present disclosure is not limited to any particular source for the prompts that may be presented to the user. In one embodiment, the prompts may be provided and/or selected by the user himself. For example, the user may select one or more images already stored in device 120. Alternatively or additionally, the user may use a camera (not shown) of the device 120 to take pictures which may then be used in the methods of the present disclosure. In some embodiments, a library of prompts may be used instead of user-provided prompts, and the library may be of a suitable size to permit a user to select a personalized subset of prompts while minimizing the potential for "phishing." It is to be understood that any suitable source of prompts is within the scope of the present disclosure and, moreover, the set of prompts used to create the prompt/character string associations may be selected from more than one source and the prompts may be mixed and matched from different sources in any manner.

In embodiments in which the device 120 has a camera (not shown), an audio recorder (not shown) or a video recorder (not shown), the system may suggest that the user utilize some of the images, audio and/or video the user has captured as prompts. For example, on a periodic basis (or as new photos, audio and/or video become available), the system may inquire whether the user would like to update the prompt/character string associations using the images, audio and/or video the user has captured using the device 120.

It is also to be recognized that the present disclosure is not limited to any particular types of prompts that may be used together. By way of example and not limitation, instead of eight images, the user may be presented with two images, two audio clips, two textual prompts and two video clips, in any order. Thus, a set of prompts may include any number and/or type of prompts.

The system may include appropriate safeguards to ensure that readily identifiable (or guessable) associations are not created. For example, if the prompt is an image of a person in the user's "Contacts" application, the system may ensure that the contact's name (or initials), address, or any other information associated with the person in the Contacts application is not associated with the image. As another example, if the prompt is an excerpt from a song, the system may ensure that the song's title, the artist, or lyrics from the song are not associated with the prompt.

In one exemplary embodiment, during an initial association of images and character strings, nine image/character string associations may be created. Of those nine, three associations may be created from contacts or images stored on the smartphone, with the user selecting the contacts or images and entering the associations, three associations may be generated automatically and presented to the user (for example, three randomly selected texts as prompts and associated character strings) and three associations may be based on user selection of images from a large library and entry of those associations.

In some embodiments, users may be provided with a larger number of prompts (for example, thirty images), but may provide only 1 bit of information (such as "like/do not like") for each of the prompts.

In one embodiment, the system may implement a policy of requesting that the user change one or more of the prompt/character string associations at regular intervals. For example, it may require at least one prompt and/or character string association to be changed per month.

Figure 2B:
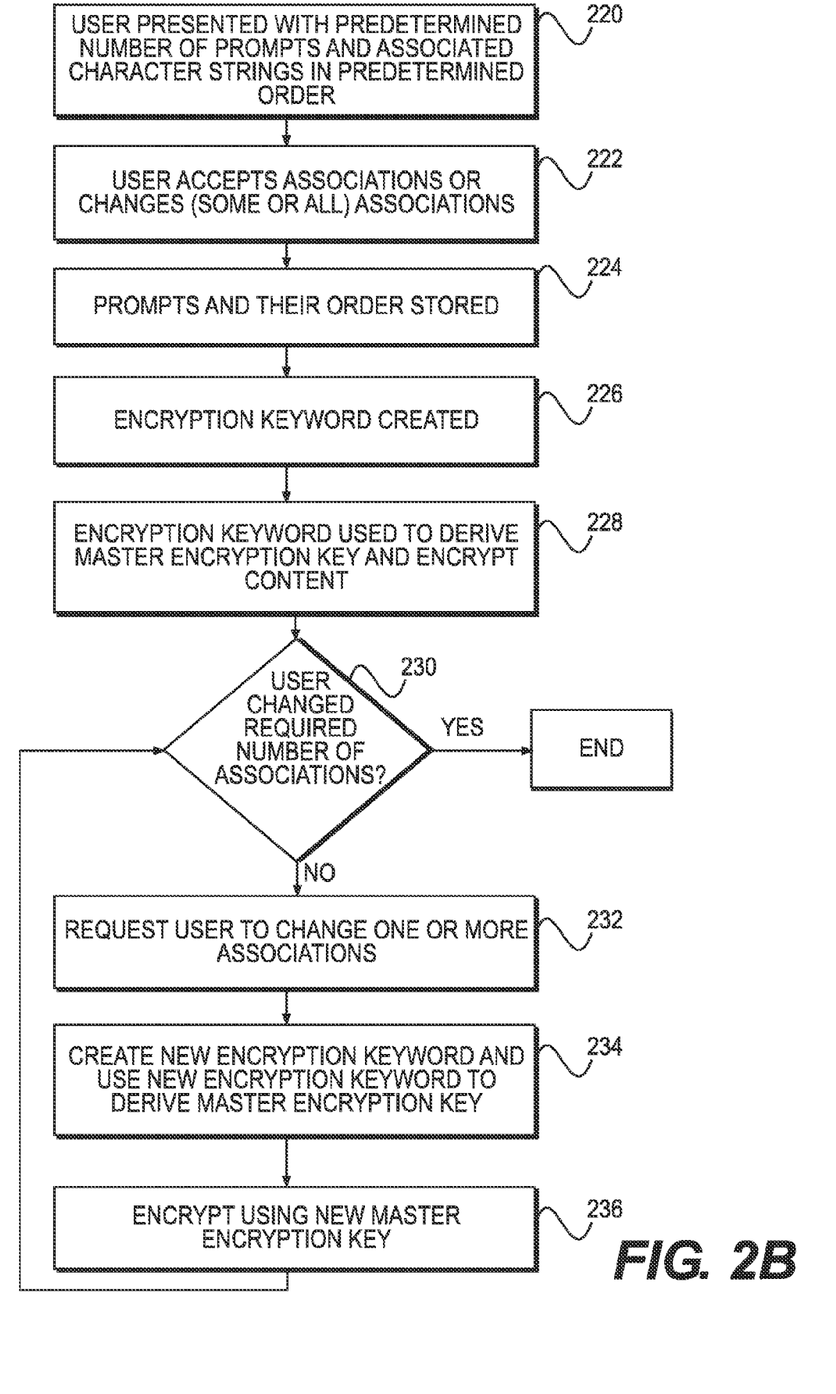
FIG. 2B is a flow diagram of an alternative exemplary method for creating a Master Encryption Key, that may be used in the encryption/decryption process, using one or more prompts.

In certain situations, it may be difficult or too time consuming for a user to create the predetermined number of prompt/character string associations required by, for example, the process described with respect to FIG. 2A. To address such situations, FIG. 2B, depicts an exemplary process of gradual personalized association that may make the process of creating prompt/character string associations initially less time consuming (and possibly easier) for users while maintaining overall system security. At step 220, the user is presented with a predetermined number of prompts and associated character strings in a predetermined order. For example, the password engine 130 (or some other process, routine, module or application) automatically generates eight image/character string associations and presents them to the user. To enhance security, automatically generated prompt/character string associations may be created randomly and may not have any particular meaning to the user.

At step 222, the user may accept some or all of the automatically generated prompt/character string associations, or the user may instead change some or all of the character strings associated with prompts. At step 224, the prompts presented to the user (as well as the order of each prompt in the sequence of prompts that is presented to the user) are stored in the authentication prompt storage 135. In some embodiments, as necessary, the images (and their order) may also be associated with a User ID of the user.

At step 226, the character strings associated with each image (as perhaps modified by the user) are combined, in the same order in which the images were stored in the authentication prompt storage 135, to create an Encryption Keyword. At step 228, the Encryption Keyword is used to derive a Master Encryption Key and encrypt the content of the password storage 140, as described for example with respect to FIG. 2A. At this point, the user is capable of authenticating himself or herself using, for example, the process described with respect to FIG. 2C.

At step 230 (which may, for example, happen at regular intervals), the process determines whether the user changed some or all of the character strings associated with the images. If at step 230 all (or the predetermined required number) of the automatically generated prompt/character string associations have been changed, then the process may end. If at step 230 less than all of the prompt/character string associations were changed by the user (or less than a predetermined number of user generated associations required by the process), at step 232, the process may request that the user replace one or more of the unchanged automatically generated prompt/character string associations with a user generated association.

It is to be recognized that steps 230 and subsequent steps need not occur immediately after (either in time or logically) step 228. Rather, the process may wait a predetermined amount of time (e.g., a day, a week, the next time the user attempts to authenticate himself, etc.) before performing step 230. At step 234, the process may create a new Encryption Keyword based on the character strings associated with the prompts in a similar manner as already described herein. At step 236, the new Encryption Keyword may be used to derive a new Master Encryption Key and to re-encrypt the contents of the password storage 140 using the new Master Encryption Key. It is to be understood, however, that before re-encrypting the contents of the password storage using the new Master Encryption Key, the contents of the password storage first need to be decrypted using the existing Master Encryption Key. Thereafter, the process may return to step 230 as necessary. Accordingly, this exemplary embodiment permits the user to generate associations over time rather than to generate all associations at one time.

Figure 2C:
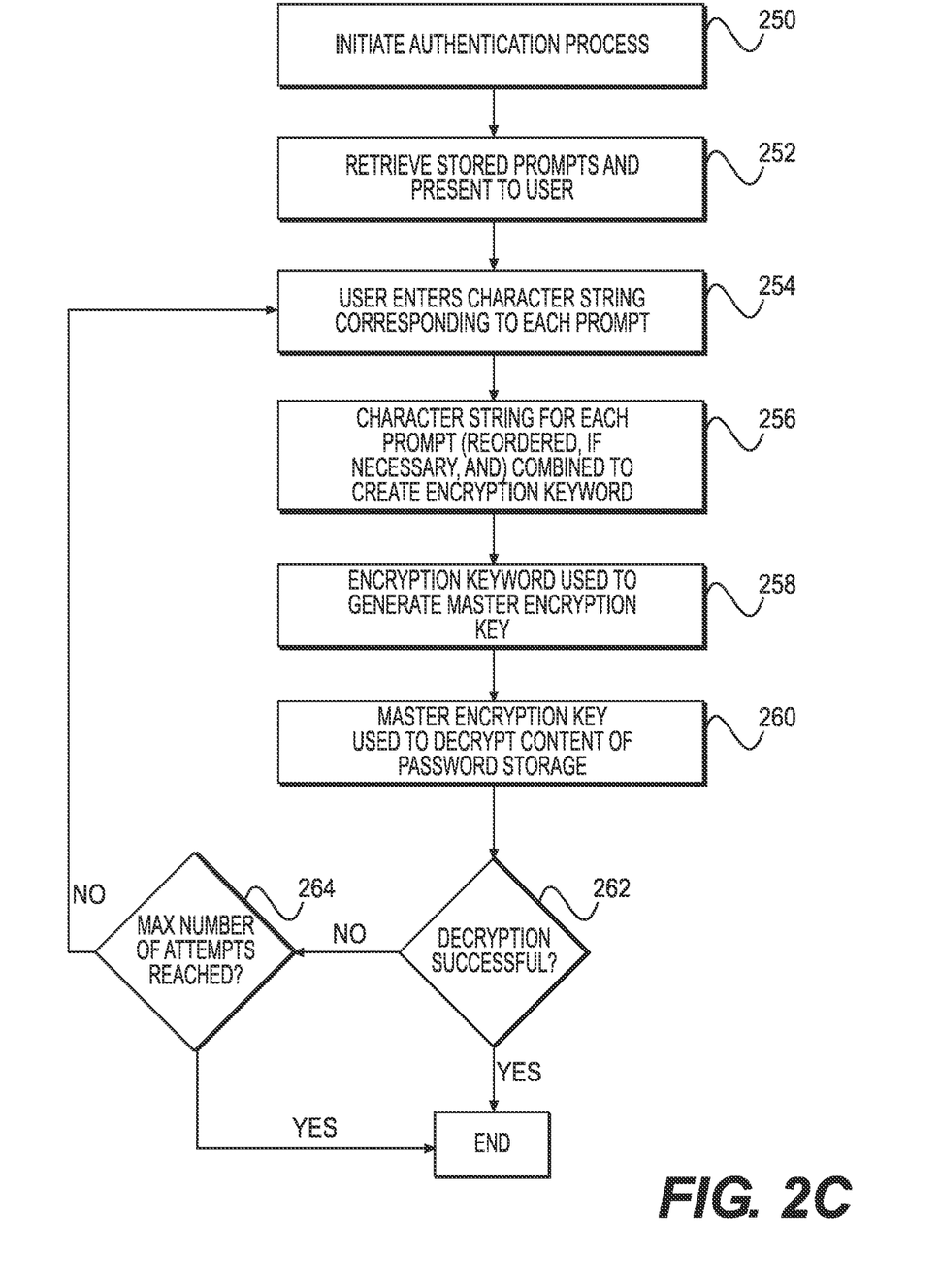
FIG. 2C is a flow diagram of an exemplary method for authenticating a user according to the present disclosure.

FIG. 2C depicts an exemplary process by which a user may authenticate himself by providing the correct character strings associated with prompts provided to the user. It can be appreciated that because the prompts may evoke an association in the user's mind that may be expressed using a character string, the user may more easily remember the character strings and may be able to remember more character strings than he or she otherwise might without the prompts. The character strings provided by the user may be used to calculate an Encryption Keyword, which may then be used to deterministically derive a Master Encryption Key that may be used to decrypt (or, depending on the context, re-encrypt) the content of the password storage 140.

At step 250, a user may initiate the authentication process. In a single user environment, this step may occur by the user simply indicating the desire to authenticate. In a multi-user environment, the step may occur upon submission of a user ID. Alternatively, the process may be initiated in any appropriate manner known in the art or developed in the future.

At step 252, the prompts associated with the user (e.g., eight images) are retrieved from the authentication image storage 135 and presented to the user (for example, on the display 123 of the device 120). The prompts may be presented to the user in any order. Thus, while the user may have been presented with eight images in the sequential order Img1 through Img8 during the Master Encryption Key creation process depicted in FIG. 2A or 2B, during the authentication process the images may be presented to the user in a random order instead of sequentially (although it is within the scope of the present disclosure that the images be presented to the user in the same order in which they were presented during the process discussed with respect to FIG. 2A or 2B).

At step 254, the user enters the character string corresponding to each image in the order in which the image is displayed on the screen.

Figure 2D:
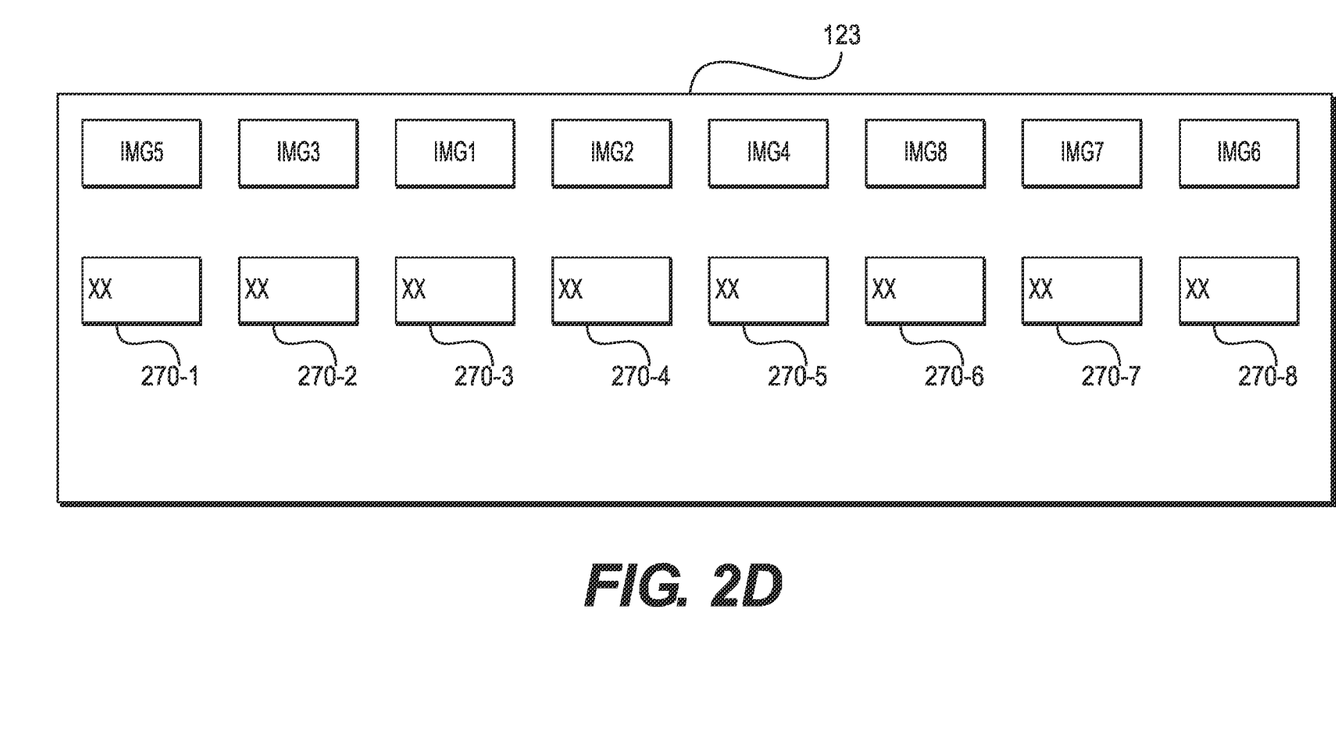
FIG. 2D is a block diagram of an exemplary manner in which information may be presented to a user on a screen to authenticate the user according to the present disclosure.

FIG. 2D is a block diagram of an exemplary manner and order in which the images may be displayed on a screen 123 of the device 120 during the authentication process described with respect to FIG. 2C. As shown in FIG. 2D, each image may in turn have a corresponding character string entry location 270-1 through 270-8. Based on the image/character string association performed in FIG. 2A and illustrated in Table 1, an authorized user would enter the string IJ in entry location 270-1, EF in entry location 270-2, and AB, CD, GH, OP, MN, and KL in the subsequent entry locations 270-3 through 270-8, respectively. Alternatively, there may be only one character string entry location, and the user may enter all of the character strings associated with the images continuously (with or without spaces) in the order in which the images are displayed on the screen, Returning to FIG. 2C, at step 256, the character strings entered by the user are combined to create an Encryption Keyword. If necessary, before creating the Encryption Keyword, the images presented to the user at step 252 (and their associated character strings entered by the user at step 254) are reordered in the order in which the images were stored in the authentication prompt storage 135. By way of example and not limitation, if images were stored in the authentication image storage 135 sequentially as Img1 through Img8, and at the time of step 252 images were displayed to the user in a random order as depicted in FIG. 2D, and the character strings entered by the user in entry locations 270-1 through 270-8 at step 264 were IJ, EF, AB, CD, GH, OP, MN, and KL, respectively, then the character string corresponding to Img1, would be AB, the character string corresponding to Img2 would be CD, and so on. By reordering the associated character strings entered by the user in the order in which the corresponding images were stored in the authentication prompt storage 135, the process can create the Encryption Keyword ABCDEFGHIJKLMNOP.

At step 258, the Encryption Keyword may be used to deterministically derive the Master Encryption Key. Any deterministic method may be used so long as the method used during the authentication process is the same one used during the encryption process (as shown, for example, in FIG. 2A or 2B). At step 260, the derived Master Encryption Key is used to attempt to decrypt the contents of the password storage 140. If the user had entered the correct character strings associated with each prompt at step 254, then at step 262 the decryption process will be successful. In some embodiments, password storage 140 may include some form of hash or checksum to assist in the determination whether the decryption was successful.

If the user made a mistake in entering at least one of the associated character strings, then at step 262 the contents of the master storage 140 will not be successfully decrypted. In that event, at step 264, the process may optionally determine whether the user has exceeded a maximum number of tries to decrypt the contents of the password storage 140. For example, to avoid attacks and improve security, the user may be provided with only a limited number (e.g., 5) tries to enter the correct associations. Additionally, or alternatively, there may also be a limit on the frequency of attempts. For example, there may be a limit of one authentication attempt per minute (or some other predetermined duration). In other embodiments, this limit on the frequency of attempts may increase as the number of incorrect attempts in a row increases.

If at step 264 the maximum number of attempts have not been exceed, the process may return to step 254 (or to 252, depending on the specific implementation) for the user to attempt to authenticate himself or herself again.

In some embodiments, the Encryption Keyword and/or the Master Encryption Key may be cached or temporarily stored for a predefined amount of time after the Encryption Keyword is generated and/or the Master Encryption Key is derived from the Encryption Keyword. In some embodiments, the predetermined amount of time for which the Encryption Keyword and/or Master Encryption Key are cached may depend on user activity on the device 120. For example, the cached Encryption Keyword and/or Master Encryption Key may be removed from memory after a certain period of inactivity.

It can be appreciated that a user may successfully authenticate himself or herself, and the contents of the password storage 140 may be successfully decrypted, without the character strings, Encryption Keyword and/or Master Encryption Key ever having been permanently stored in non-volatile memory.

In an alternative embodiment in which a hash of the Encryption Keyword and/or the Master Encryption Key is stored in non-volatile memory (e.g. pursuant to optional step 209 in FIG. 2A), at step 260, before attempting to decrypt the contents of the password storage 140, the process may calculate a hash of the Encryption Keyword and/or Master Encryption Key generated at steps 256 and/or 258 and compare them to the hash of the Encryption Keyword and/or Master Encryption Key stored in memory. If the calculated hash and the stored hash match, then the process can be assured that the Master Encryption Key is correct and proceed to decrypt the content of the password storage 140. If the calculated hash and the stored hash do not match, the process may proceed directly to optional step 264 and providing the user an opportunity to reenter the character strings without going through the process of attempting to decrypt the contents of the password with a Master Encryption Key that is not correct.

In some embodiments, instead of, or in addition to, obtaining the Encryption Keyword using the method described with respect to steps 250 through 264, a separate password or passphrase may also be entered directly using the device keyboard. This separate password or passphrase may be used in combination with the Encryption Keyword, to generate a Master Encryption Key. In some embodiments, an additional password or passphrase may be required to be entered before the prompts are presented to the user.

In some embodiments, to thwart certain classes of attacks (such as brute force attacks), all the passwords 140-1 through 140-n stored in the password storage 140 may be erased if the number of incorrect attempts in a row exceeds some predefined number, for example, five.

In some embodiments, during the authentication process (as described, for example, with respect to FIG. 2C), the user may be permitted to indicate that he or she does not remember the character string associated with one or more of the prompts. To permit such functionality, the contents of the password storage 140 may be encrypted multiple times as described herein. For example, assume that at the time of creating the prompt/character string associations the user is required to create eight associations, but at the time of authentication the user is permitted to respond that he or she does not remember any single one of the associations. To permit the user to access the encrypted content of the password storage 140 even though he does not remember one of the eight associations, in one embodiment, nine copies of the contents of the password storage 140 may be stored in the password storage 140, with each copy encrypted separately. More particularly, one copy may be encrypted with a Master Encryption Key derived from an Encryption Keyword corresponding to the user entering all eight associations. The other eight copies may each be encrypted with one of eight separate Master Encryption Keys, each Master Encryption Key derived from an Encryption Keyword that is missing one of the eight associations.

In another embodiment, it may be sufficient to store only eight copies of the contents of the password storage content, with each copy encrypted with a Master Encryption Key derived from an Encryption Keyword that is missing one of the eight associations. In such an embodiment, the following process may be used to ensure that a user has entered all eight associations correctly, and to decrypt the contents of the password storage when the user has selected to nevertheless enter all eight prompt/character string associations. First, the eight character strings entered by the user may be used to create a first and a second Encryption Keyword, whereby each Encryption Keyword is missing one of the eight associations and each of eight associations is present in at least one Encryption Keyword. Second, the first and second Encryption Keywords may be used to derive first and second Master Encryption Keys, respectively. Third, the first and second Master Encryption Keys may each be used separately to decrypt the content of the password storage 140. If the results of the decryption using each of the first and second Master Encryption Keys are identical, then it has been established that the user entered all eight prompt/character string associations correctly.

This technique may be extended to allow more than one "I don't remember" or "I don't know" answer by the user. However, the number of copies stored grows quickly as the number of permitted "I don't remember" or "I don't know" answers increases. For example, in one implementation, in the same embodiment of eight prompt/character string associations, to allow up to two "I don't remember" answers, as many as 37 copies of the content of the password storage may need to be encrypted (i.e. 1+C(8,1) (to account for all possibilities of one "I don't remember" answer+C(8,2) (to account for all possibilities of two "I don't remember" answers)).

In another embodiment, for example, using techniques similar to those described above and techniques knows to those with ordinary skill in the art, it may be possible to reduce the number of copies to 28 (i.e., C(8,2), which is equal to 28) while still allowing two "I don't remember" answers. However, if multiple "I don't remember" answers are allowed, the overall security of the system may be reduced.

To avoid having to store multiple copies of the content of the password storage 140, in one embodiment, the contents of the password storage 140 are encrypted and stored once using an intermediate randomly generated symmetric key. That intermediate randomly generated key can then be encrypted multiple times (e.g., 8 or 9 times in the case of eight associations and one permitted "I don't know," or 37 or 28 times in the case of eight associations and two permitted "I don't knows") using the technique described in the preceding discussion. Thus, the content of the password storage 140 need only be stored once, and it is the (encrypted) intermediate randomly generated key that needs to be stored multiple times.

It is to be appreciated that the user may elect to change one or more of the prompts and/or the character strings associated with the prompts at any time. This will result in a new Encryption Keyword. Should this occur, the contents of the password storage 140 will need to be re-encrypted using a new Master Encryption Key derived from the new Encryption Keyword. In some embodiments, the user may not be permitted to change the associations and/or to re-encrypt the content of the password storage 140 using a new Master Encryption Key unless and until the user has successfully decrypted the content of the password storage 140 using the old Encryption Keyword and Master Encryption Key.

For security reasons, in some embodiments, password engine 130 may prohibit releasing decrypted sets of passwords, thereby disallowing "mass decrypt" operation, and allowing only a "mass re-encrypt" operation.

It will be understood by one having ordinary skill in the art that in some embodiments, particularly those in which a hash of the Encryption Keyword and/or Master Encryption Key has not been stored in non-volatile memory, the whole password storage 140, as well as individual passwords (e.g., 140-1 through 140-n) in password storage 140 may be stored without any hashes or checksums. In such embodiments, decryption with even an incorrect Master Encryption Key may still produce a plausible result (i.e., a set of data that appears to be passwords 140-1 through 140-n). To validate that the Master Encryption Key was correct, it may be necessary to contact one of the services that requires a password stored in password storage 140. Such an embodiment would impose an additional burden on an attacker because the attacker will not only need to determine a Master Encryption Key that can be used to return a plausible set of unencrypted passwords, but the attacker will need to attempt to use at least one of the passwords to ensure that the Master Encryption Key used was correct. On the other hand, restricting number of guessing attempts becomes more difficult in such embodiments because, in such an embodiment, the password storage 140 itself has no criterion to determine whether the decryption has been successful and, therefore, whether the user entered the correct associations.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each imaged apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)— but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus, comprising:
   a non-volatile storage;
   a user interface; and a password engine configured to:
retrieve two or more predetermined prompts from the non-volatile storage;
present, in a random order, the two or more predetermined prompts on the user interface to a user;
receive a first set of input(s) in response to the two or more predetermined prompts, each input of the first set of input(s) corresponding to one of the two or more predetermined prompts respectively;
create an encryption keyword from the received first set of input(s) by organizing each input of the first set of input(s) according to an original order of the two or more predetermined prompts stored in the non-volatile storage for organizing the two or more predetermined prompts, wherein the original order is independent from the order in which the two or more predetermined prompts are presented and the first set of input(s) are received; and
use the encryption keyword to authenticate the user.

2. The apparatus of claim 1, wherein in using the encryption keyword to authenticate the user, the password engine is further configured to:
derive a master encryption key from the encryption keyword; and
decrypt content of a password storage using the master encryption key.

3. The apparatus of claim 1, wherein the password engine is further configured to:
generate a plurality of prompts;
present the generated plurality of prompts on the user interface to the user;
receive a second set of input(s) in response to the generated plurality of prompts; and
store, in the non-volatile storage, the generated plurality of prompts as the two or more predetermined prompts, the original order of the plurality of prompts presented to the user, and a result of a calculation using the encryption keyword, wherein the encryption keyword is created from the second set of input(s).

4. The apparatus of claim 3, wherein the password engine is further configured to:
create a plurality of additional encryption keywords, each being created from a subset of the second set of input(s), each subset of the second set of input(s) missing input(s) to at least one prompt respectively.

5. The apparatus of claim 4, wherein the password engine is further configured to:
derive a plurality of encryption keys from the encryption keyword and the plurality of additional keywords respectively; and
generate a plurality of copies of a secure storage using the plurality of encryption keys respectively.

6. The apparatus of claim 4, wherein the password engine is further configured to:
derive a plurality of encryption keys from the encryption keyword and the plurality of additional keywords respectively;
generate a symmetric key and use the symmetric key to generate one copy of a secure storage; and
encrypt the symmetric key using the plurality of encryption keys respectively.

7. The apparatus of claim 3, wherein the encryption keyword is one of a plurality of encryption keywords, each being created from a subset of the received second set of input(s) and each subset of the second set of input(s) missing input(s) to at least one prompt respectively, and the password engine is further configured to:
derive a plurality of encryption keys from the plurality of encryption keywords respectively; and
generate a plurality of copies of a secure storage using the plurality of encryption keys respectively.

8. The apparatus of claim 3, wherein the password engine is configured to generate at least one of the generated plurality of prompts using a camera, an audio recorder or a video recorder.

9. The apparatus of claim 8, wherein the password engine is configured to associate the generated plurality of prompts with respective character strings, and wherein the second set of input(s) includes acceptance of at least some of the associated character strings, changes to at least some of the associated character strings, or both.

10. The apparatus of claim 3, wherein the password engine is further configured to:
generate a hash of the encryption keyword; and
store the generated hash to the non-volatile storage.

11. The apparatus of claim 1, wherein the password engine is further configured to:
generate a hash of the encryption keyword; and
compare the generated hash to a hash retrieved from the non-volatile storage.

12. The apparatus of claim 1, wherein the first set of input(s) include at least one of character(s), foreign language characters, or symbols.

13. The apparatus of claim 1, wherein the first set of input(s) are a plurality of character strings.

14. The apparatus of claim 13, wherein the password engine is further configured to create the encryption keyword from the received first set of input(s) by combining the plurality of character strings according to the original order of the two or more predetermined prompts.

15. The apparatus of claim 1, wherein the password engine is further configured to present, on the user interface, respective entry locations corresponding to each of the two or more predetermined prompts to receive the first set of input(s).

16. The apparatus of claim 1, wherein the password engine is further configured to present, on the user interface, a single entry location to receive the first set of input(s) of the two or more predetermined prompts.

17. A computer-implemented method for authenticating a user, comprising:
retrieving two or more predetermined prompts from a non-volatile storage;
presenting the two or more predetermined prompts on a user interface to the user in a random order;
receiving a first set of input(s) in response to the two or more prompts, each input of the first set of input(s) corresponding to one of the two or more predetermined prompts respectively;
creating an encryption keyword from the received first set of input(s) by organizing each input of the first set of input(s) according to an original order of the two or more predetermined prompts stored in the non-volatile storage for organizing the two or more predetermined prompts, wherein the original order is independent from the order in which the two or more predetermined prompts are presented and the first set of input(s) are received; and
using the encryption keyword to authenticate the user.

18. The computer-implemented method of claim 17, further comprising:
deriving a master encryption key from the encryption keyword; and
decrypting content of a password storage using the master encryption key.

19. The computer-implemented method of claim 17, further comprising:
   generating a plurality of prompts;
   presenting the generated plurality of prompts on the user interface to the user;
   receiving a second set of input(s) in response to the generated plurality of prompts; and
   storing, in the non-volatile storage, the generated plurality of prompts as the two or more predetermined prompts, the original order of the plurality of prompts presented to the user, and a result of a calculation using the encryption keyword, wherein the encryption keyword is created from the second set of input(s).

20. The computer-implemented method of claim 19, further comprising:
   creating a plurality of additional encryption keywords, each being created from a subset of the second set of input(s), each subset of the second set of input(s) missing input(s) to at least one prompt respectively.

21. The computer-implemented method of claim 20, further comprising:
   deriving a plurality of encryption keys from the encryption keyword and the plurality of additional keywords respectively; and
   generating a plurality of copies of a secure storage using the plurality of encryption keys respectively.

22. The computer-implemented method of claim 20, further comprising:
   deriving a plurality of encryption keys from the encryption keyword and the plurality of additional keywords respectively;
   generating a symmetric key and use the symmetric key to generate one copy of a secure storage; and
   encrypting the symmetric key using the plurality of encryption keys respectively.

23. The computer-implemented method of claim 19, wherein the encryption keyword is one of a plurality of encryption keywords, each being created from a subset of the received second set of input(s) and each subset of the second set of input(s) missing input(s) to at least one prompt respectively, and the computer-implemented method further comprises:
   deriving a plurality of encryption keys from the plurality of encryption keywords respectively; and
   generating a plurality of copies of a secure storage using the plurality of encryption keys respectively.

24. The computer-implemented method of claim 19, further comprising generating at least one of the generated plurality of prompts using a camera, an audio recorder or a video recorder.

25. The computer-implemented method of claim 24, further comprising associating the generated plurality of prompts with respective character strings, wherein the second set of input(s) includes acceptance of at least some of the associated character strings, changes to at least some of the associated character strings, or both.

26. The computer-implemented method of claim 19, further comprising:
   generating a hash of the encryption keyword; and
   storing the generated hash to the non-volatile storage.

27. The computer-implemented method of claim 17, further comprising.
   generating a hash of the encryption keyword; and
   comparing the generated hash to a hash retrieved from the non-volatile storage.

28. The computer-implemented method of claim 17, wherein the first set of input(s) include at least one of character(s), foreign language characters, or symbols.

29. The computer-implemented method of claim 17, wherein the first set of input(s) are a plurality of character strings.

30. The computer-implemented method of claim 29, further comprising combining the plurality of character strings according to the original order of the two or more predetermined prompts to create the encryption keyword from the received first set of input(s).

31. The computer-implemented method of claim 17, further comprising presenting, on the user interface, respective entry locations corresponding to each of the two or more predetermined prompts to receive the first set of input(s).

32. The computer-implemented method of claim 17, further comprising presenting, on the user interface, a single entry location to receive the first set of input(s) of the two or more predetermined prompts.

33. A non-transitory computer readable medium containing program instructions for a method of authenticating a user, the instructions causing a computer to execute the method, comprising:
   retrieving two or more predetermined prompts from a non-volatile storage;
   presenting the two or more predetermined prompts on a user interface to the user in a random order;
   receiving a first set of input(s) in response to the two or more prompts, each input of the first set of input(s) corresponding to one of the two or more predetermined prompts respectively;
   creating an encryption keyword from the received first set of input(s) by organizing each input of the first set of input(s) according to an original order of the two or more predetermined prompts stored in the non-volatile storage for organizing the two or more predetermined prompts, wherein the original order is independent from the order in which the two or more redetermined from are presented and the first set of input(s) are received; and
   using the encryption keyword to authenticate the user.

34. The non-transitory computer readable medium of claim 33, wherein the method further comprises:
   deriving a master encryption key from the encryption keyword; and
   decrypting content of a password storage using the master encryption key.

35. The non-transitory computer readable medium of claim 33, wherein the method further comprises:
   generating a plurality of prompts;
   presenting the generated plurality of prompts on the user interface to the user;
   receiving a second set of input(s) in response to the generated plurality of prompts; and
   storing, in the non-volatile storage, the generated plurality of prompts as the two or more predetermined prompts, the original order of the plurality of prompts presented to the user, and a result of a calculation using the encryption keyword, wherein the encryption keyword is created from the second set of input(s).

* * * * *

UNITED STATES PATENT AND TRADEMARK OFFICE
CERTIFICATE OF CORRECTION

Page 1 of 1

PATENT NO. : 9,065,655 B2
APPLICATION NO. : 13/920530
DATED : June 23, 2015
INVENTOR(S) : Sergey Ignatchenko It is certified that error appears in the above-identified patent and that said Letters Patent is hereby corrected as shown below:

In the claims

In claim 33 at col. 16, line 40, change "redetermined from" to --predetermined prompt--.

Signed and Sealed this
Twentieth Day of October, 2015

Michelle K. Lee
*Director of the United States Patent and Trademark Office*